United States Patent
Hirano et al.

(10) Patent No.: US 12,059,742 B2
(45) Date of Patent: Aug. 13, 2024

(54) HOLDING JIG AND HOLDING JIG SET FOR DOUBLE-ACTING FRICTION STIR SPOT WELDING, DOUBLE-ACTING FRICTION STIR SPOT WELDING DEVICE, AND DOUBLE-ACTING FRICTION STIR SPOT WELDING METHOD

(71) Applicant: KAWASAKI JUKOGYO KABUSHIKI KAISHA, Kobe (JP)

(72) Inventors: Masaaki Hirano, Kakamigahara (JP); Etsuko Yamada, Ichinomiya (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 111 days.

(21) Appl. No.: 17/842,813

(22) Filed: Jun. 17, 2022

(65) Prior Publication Data
US 2022/0324052 A1  Oct. 13, 2022

Related U.S. Application Data

(60) Division of application No. 16/810,856, filed on Mar. 6, 2020, now Pat. No. 11,396,060, which is a
(Continued)

(30) Foreign Application Priority Data
Sep. 8, 2017  (JP) .................. 2017-172966

(51) Int. Cl.
B23K 20/12  (2006.01)
(52) U.S. Cl.
CPC ........ *B23K 20/126* (2013.01); *B23K 20/1225* (2013.01)

(58) Field of Classification Search
None
See application file for complete search history.

(56) References Cited

U.S. PATENT DOCUMENTS 5,617,652 A   4/1997 Mueller
5,697,544 A * 12/1997 Wykes ................ B23K 20/125
                                                228/2.1
(Continued)

FOREIGN PATENT DOCUMENTS

JP   9-57455 A      3/1997
JP   2003-260573 A  9/2003
(Continued)

OTHER PUBLICATIONS

Extended European Search Report issued Dec. 11, 2020 in European Application No. 18854125.4.

*Primary Examiner* — Devang R Patel
(74) *Attorney, Agent, or Firm* — XSENSUS LLP

(57) ABSTRACT

In a double-acting friction stir spot welding device or a double-acting friction stir spot welding method, a pin member and a cylindrical shoulder member that rotates around the axis of the pin member are used as rotary tools, and a clamp member that has a cylindrical shape positioned so as to surround the outside of the shoulder member and is configured to press a workpiece from an obverse surface with an annular pressing surface of the distal end is used as a holding jig. The clamp member has an inclined surface that is adjacent to the inner edge portion of the pressing surface and inclined so as to reduce the inner diameter of the clamp member toward the back side as viewed from the pressing surface.

8 Claims, 9 Drawing Sheets

Related U.S. Application Data continuation of application No. PCT/JP2018/033255, filed on Sep. 7, 2018.

(56) References Cited

U.S. PATENT DOCUMENTS

| | | |
|---|---|---|
| 5,714,018 A | 2/1998 | Kita et al. |
| 8,950,650 B2 | 2/2015 | Okada et al. |
| 9,095,926 B2 | 8/2015 | Okada et al. |
| 2007/0152015 A1 | 7/2007 | Burton et al. |
| 2010/0038832 A1 | 2/2010 | Rosal et al. |
| 2010/0159269 A1 | 6/2010 | Matlack et al. |
| 2013/0134205 A1 | 5/2013 | Cooper |
| 2014/0069985 A1 | 3/2014 | Okada et al. |
| 2014/0069986 A1 | 3/2014 | Okada et al. |
| 2015/0231734 A1 | 8/2015 | Okada et al. |
| 2018/0071861 A1 | 3/2018 | Masaki et al. |

FOREIGN PATENT DOCUMENTS

| | | |
|---|---|---|
| JP | 2005-205496 A | 8/2005 |
| JP | 2012-196680 A | 10/2012 |
| JP | 2012-196681 A | 10/2012 |
| JP | 2012-196682 A | 10/2012 |

* cited by examiner

HOLDING JIG AND HOLDING JIG SET FOR DOUBLE-ACTING FRICTION STIR SPOT WELDING, DOUBLE-ACTING FRICTION STIR SPOT WELDING DEVICE, AND DOUBLE-ACTING FRICTION STIR SPOT WELDING METHOD

CROSS-REFERENCE TO RELATED APPLICATIONS

The present application is a divisional of U.S. application Ser. No. 16/810,856, filed Mar. 6, 2020, which is a bypass continuation of PCT International Patent Application No. PCT/JP2018/033255, filed Sep. 7, 2018, currently pending, which claims priority from Japanese Patent Application No. 2017-172966, filed Sep. 8, 2017, the disclosures of each of which are hereby incorporated by reference in their entireties into the present application.

TECHNICAL FIELD

The present application relates to a holding jig and a holding jig set that are used for double-acting friction stir spot welding and hold a workpiece, a double-acting friction stir spot welding device using the holding jig and the holding jig set, and a double-acting friction stir spot welding method.

BACKGROUND

Double-acting friction stir spot welding uses, as a rotary tool, a substantially cylindrical pin member and a substantially cylindrical shoulder member having a hollow for the insertion of the pin member. The pin member and the shoulder member can rotate and advance/retract independently. These rotary tools are pressed (press-fitted) into workpieces such as a metal material. The workpieces are softened and stirred by using frictional heat with the workpieces, thereby welding the workpieces to each other.

In such double-acting friction stir spot welding, in addition to a rotary tool, a clamp member that presses and supports a workpiece is often used. For example, a double-acting friction stir spot welding device is proposed that is configured to include a cylindrical clamp member that is located outside the shoulder member and has a hollow like the shoulder member. Because the clamp member can stably support a workpiece by pressing the workpiece, the pin member or shoulder member that rotates at high speed can be properly pressed into the workpiece.

If the pin member and the shoulder member, which are rotary tools, and the clamp member are collectively referred to as "welding tools" for double-acting friction stir spot welding, the welding tools are configured such that the substantially cylindrical shoulder member is located on the outer periphery of the pin member, and the substantially cylindrical clamp member is located on the outer periphery of the shoulder member. In other words, the welding tools have a nested structure in which the clamp me ber, the shoulder member, and the pin member are arranged concentrically.

SUMMARY

A holding jig for double-acting friction stir spot welding according to the present application is a holding jig which is used for a friction stir spot welding device for welding a workpiece by partially stirring the workpiece with rotary tools and is configured to hold the workpiece. The friction stir spot welding device includes, as the rotary tools, a cylindrical pin member that is configured to rotate around an axis and be movable forward and backward along the axis and a cylindrical shoulder member that is positioned so as to surround an outside of the pin member and is configured to rotate around the axis of the pin member and be movable forward and backward along the axis. The holding jig is a clamp member that has a cylindrical shape positioned so as to surround an outside of the shoulder member and is configured to press the workpiece from an obverse surface with an annular pressing surface of a distal end of the clamp member. The clamp member has an inclined surface that is adjacent to an inner edge portion of the pressing surface and inclined so as to reduce an inner diameter of the clamp member toward a back side as viewed from the pressing surface.

According to the configuration, a tapered inclined surface is timed inside the pressing surface of the clamp member, and a concave region whose periphery is covered with the clamp member is formed on the distal end portions of the rotary tools by aligning the contact surface of the shoulder member with the upper edge of the inclined surface. By moving the rotary tool forward and backward with respect to the workpiece in this state, the entire concave region can be filled with the material constituting the workpiece.

In particular, the press-fitting of the shoulder member stirs the material located immediately below the contact surface of the shoulder member whereas the surrounding material adjacent to the contact surface of the shoulder member is not stirred but softened to some extent. Accordingly, not only the material stirred with the press-fitting of the shoulder member but also the surrounding softened material can be filled into the concave region.

By using the material filled in the concave region, a thick region having an increased thickness is formed in the welded portion of the workpiece, and the boundary (stirred portion boundary) between the portion where the material is stirred, and the portion where the material is not stirred is located at the thick region.

A holding jig set for double-acting friction stir spot welding according to the present application is a holding jig set used for the double-acting friction stir spot welding device and configured to hold the workpiece. The holding jig set includes the holding jig for a double-acting friction stir spot welding device having the above configuration and a backing member (second holding jig) that is positioned on an advancing direction side of the rotary tools and supports a reverse surface of the workpiece on a supporting surface with the obverse surface of the workpiece facing the rotary tools. A circular concave portion having a peripheral edge portion that is an inclined surface inclined so as to reduce a diameter from the supporting surface toward a depth direction is formed in the supporting surface of the backing membe.

According to the configuration, while a concave region can be formed in the obverse surface side of a workpiece with the clamp member and the rotary tools, a concave region can also be formed in the reverse surface side of the workpiece by the concave portion in the supporting surface of the backing member. This makes it possible to form thick regions having increased thicknesses on the both surfaces of the workpiece by filling the concave regions of both surfaces of the workpiece with the material.

A double-acting friction stir spot welding device according to the present application includes the holding jig for double-acting friction stir spot welding which has the above configuration or the holding jig set for double-acting friction stir spot welding which has the above configuration.

A double-acting friction stir spot welding method according to the present application is a double-acting friction stir spot welding method of welding a workpiece held by a holding jig by partially stirring the workpiece with rotary tools. A cylindrical pin member that is configured to rotate around an axis and be movable forward and backward along the axis and a cylindrical shoulder member that is positioned so as to surround an outside of the pin member and is configured to rotate around the axis of the pin member and be movable forward and backward along the axis are used as the rotary tools in a forward/backward movable state. A clamp member that has a cylindrical shape positioned so as to surround an outside of the shoulder member and is configured to press the workpiece from an obverse surface with an annular pressing surface of a distal end of the clamp member is used as the holding jig. The clamp member has an inclined surface that is adjacent to an inner edge portion of the pressing surface and inclined so as to reduce an inner diameter of the clamp member toward a back side as viewed from the pressing surface. The method includes aligning a contact surface of the shoulder member with an upper edge of the inclined surface of the clamp member to form a concave region by at least the inclined surface and the contact surface, and filling the concave region with a material constituting the workpiece.

The above object, other objects, features, and advantages of the present application will be made clear by the following detailed description of preferred embodiments with reference to the accompanying drawings.

DESCRIPTION OF EMBODIMENTS

Figure 1:
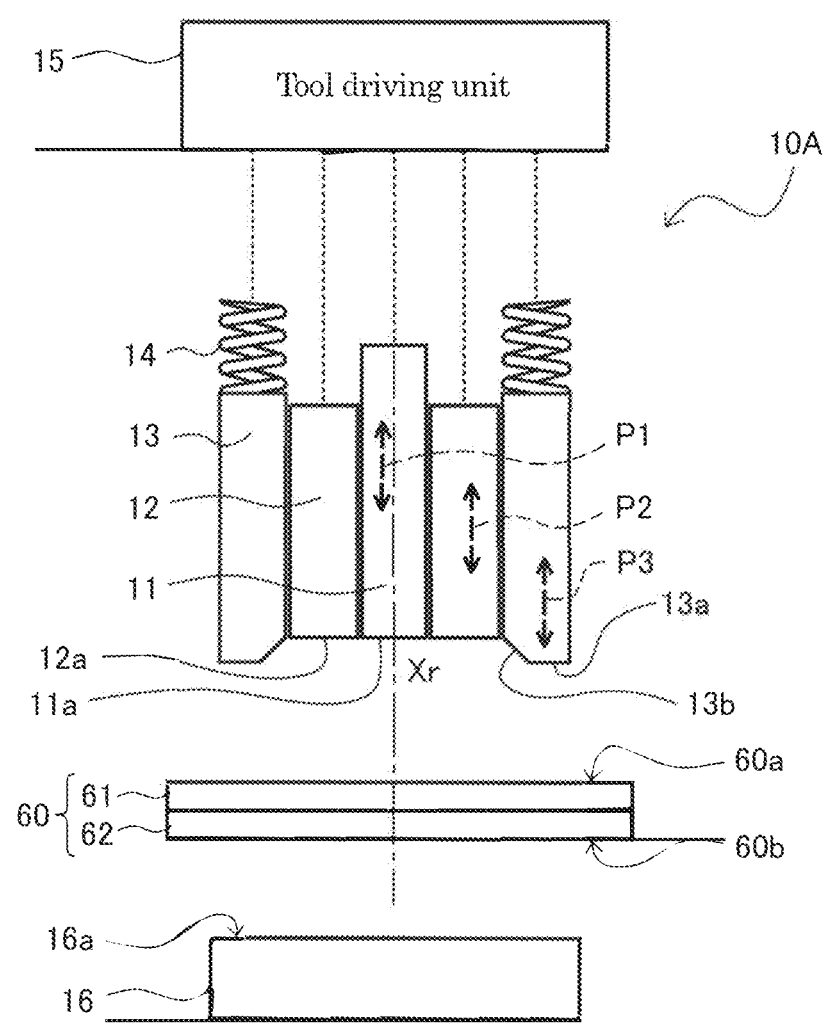
FIG. 1 is a schematic view showing the configuration of the main part of a double-acting friction stir spot welding device according to Embodiment 1 of the present application.

Typical embodiments of the present application will be described below with reference to the accompanying drawings. In the drawings, the same or corresponding elements are denoted by the same reference signs, and repeating the same descriptions is avoided below. In the following description, a double-acting friction stir spot welding device or double-acting friction stir spot welding method will be simply abbreviated as a friction stir spot welding device or friction stir spot welding method.

Embodiment 1

Friction Stir Spot Welding Device

The configuration of the main part of a friction stir spot welding device according to Embodiment 1 will be described first with reference to FIG. 1. As schematically shown in FIG. 1, a friction stir spot welding device 10A according to Embodiment 1 includes, as main components, a pin member 11 and a shoulder member 12 that are rotary tools, a clamp member 13 that is a holding jig, a spring 14 that applies an urging force to the clamp member 13, a tool driving unit 15 that drives the rotary tools, and a backing member 16 that supports a workpiece 60.

The pin member 11 is substantially cylindrical or substantially columnar and is supported by a tool fixing portion. The pin member 11 is configured to be driven by the tool driving unit 15 to rotate around an axis Xr (the rotary axis indicated by the chain line in FIG. 1) and to advance and retract along the direction indicated by a broken-line arrow P1, i.e., the direction of the axis Xr (the vertical direction in FIG. 1).

The shoulder member 12 is substantially cylindrical and has a hollow center in which the pin member 11 is inserted. The shoulder member 12 is supported by the tool fixing portion, such that the shoulder member 12 surrounds the pin member 11 at the outside of the pin member 11. The shoulder member 12 is configured to be driven by the tool driving unit 15 to rotate around the axis Xr, which is the same axis around which the pin member 11 rotates, and to advance and retract along the direction indicated by a broken-line arrow P2, i.e., the direction of the axis Xr.

As described above, in the present embodiment, both the pin member 11 and the shoulder member 12 are supported by the same tool fixing portion and driven by the tool driving unit 15 to integrally rotate around the axis Xr. In addition, the pin member 11 and the shoulder member 12 are configured to be driven by the tool driving unit 15 to advance and retract along the direction of the axis Xr independently of each other. The pin member 11 and the shoulder member 12 respectively include a contact surface 11a and a contact surface 12a at their distal ends, which come into contact with the workpiece 60. For convenience of explanation, the contact surface 11a of the pin member 11 is referred to as the pin contact surface 11a, and the contact surface 12a of the shoulder member 12 is referred to as the shoulder contact surface 12a.

The clamp member 13 is provided outside the shoulder member 12. Similar to the shoulder member 12, the clamp member 13 is cylindrical and has a hollow center in which the shoulder member 12 is inserted. Accordingly, the substantially cylindrical shoulder member 12 is positioned around the outer periphery of the pin member 11, and the substantially cylindrical clamp member 13 is positioned around the outer periphery of the shoulder member 12. In other words, the clamp member 13, the shoulder member 12, and the pin member 11 constitute a nested structure, in which these components are arranged concentrically.

The clamp member 13 presses the workpiece 60 from one surface (obverse surface). The clamp member 13 presses and holds the workpiece 60 in order to implement good friction stir spot welding. Therefore, the clamp member 13 is a holding jig in the friction stir spot welding device 10A. In Embodiment 1, the clamp member 13 is supported by a tool fixing portion through the spring 14, and hence is biased toward the backing member 16.

The clamp member 13 is configured to be advanced and retracted by the tool driving unit 15 along the direction of a broken-line arrow P3 (the same direction as the broken-line arrows P1 and P2), that is, the direction of the axis Xr as with the pin member 11 or the shoulder member 12. Similar to the pin member 11 and the shoulder member 12 that are rotary tools, the clamp member 13 includes, at its distal end, a pressing surface 13a that presses the workpiece 60.

As described above, because the clamp member 13 has a cylindrical shape positioned so as to surround the outside of the shoulder member 12, the pressing surface 13a is an annular surface. Further, as shown in FIG. 1, the clamp member 13 has an inclined surface 13b that is adjacent to the inner edge portion of the pressing surface 13a and inclined so as to reduce the inner diameter of the clamp member 13 toward the back side as viewed from the pressing surface 13a. Therefore, the clamp member 13 has a cylindrical shape, most of which has the same inner diameter and outer diameter except for the distal end portion, with only the distal end portion being tapered such that the outer diameter is maintained and the inner diameter increases toward the distal end side.

Alternatively, assume that the distal end portion of the clamp member 13 does not taper and the clamp member 13 has a cylindrical shape with the inner and outer diameters remain the same as a whole. In this case, the inclined surface 13b shown in FIG. 1 is formed by chamfering the inner virtual edge portion of the virtual pressing surface of the distal end portion of the clamp member 13. It can also be said that the inclined surface 13b is a tapered surface whose inner diameter is large at the distal end portion of the clamp member 13.

In the present disclosure, the specific configuration of the inclined surface 13b of the clamp member 13 is not particularly limited. As described above, the inclined surface 13b only needs to be an inclined surface with the inner diameter of the clamp member 13 decreasing toward the back side as viewed from the pressing surface 13a. Therefore, the inclined surface 13b may be a flat surface (plane) as schematically shown in FIG. 1, or may be a curved surface. Further, the inclined surface 13b may be configured by a single plane as shown in FIG. 1, but may be configured by a plurality of planes adjacent to each other or a plurality of curved surfaces adjacent to each other, or may be configured to include both a flat surface and a curved surface.

The height of the inclined surface 13b with respect to the pressing surface 13a, the expanding width of the inclined surface 13b with reference to the inner peripheral surface of the shoulder member 12, the inclination angle of the inclined surface 13b), the width of the inclined surface 13b itself (spacing), and the like are not specifically limited. These numerical values can be appropriately set according to various conditions especially, the thickness of the thick region described later) required for the welded portion formed on the workpiece 60.

In Embodiment 1, the tool driving unit 15 rotates the pin member 11 and the shoulder member 12 as rotary tools independently of each other and moves the rotary tools and the clamp member 13 as a holding jig forward and backward independently of each other. The specific configuration is not particularly limited, and a known configuration can be suitably used. FIG. 1 schematically shows the tool driving unit 15 as a block. Further, FIG. 1 schematically shows the driving (rotation driving, forward/backward movement, and other types of driving) of the pin member 11, the shoulder member 12, and the clamp member 13 by the tool driving unit 15 by connecting the block of the tool driving unit 15 to the rotary tools and the holding jig with dotted lines.

Note that the tool driving unit 15 may be configured to drive the rotary tools (the pin member 11 and the shoulder member 12) but not to move the clamp member 13 as a holding jig forward and backward. That is, the friction stir spot welding device 10A may include a jig driving unit that drives the clamp member 13 separately from the tool driving unit 15 that drives only the rotary tools. Moreover, the tool driving unit 15 may be configured to be controlled via a control unit.

The backing member 16 is positioned on the advancing direction (axis Xr direction) side of the pin member 11 and the shoulder member 12 (and the clamp member 13). In other words, the backing member 16 is positioned so as to face the rotary tools and the clamp member 13. The configuration of the backing member 16 is not particularly limited, so long as the backing member 16 is configured to properly support the workpiece 60 so that friction stir spot welding can be performed on the workpiece 60.

The specific configuration of the workpiece 60 is not particularly limited, and various configurations are assumed. In Embodiment 1, as shown in FIG. 1, for the convenience of explaining friction stir spot welding, as the workpiece 60, an example in which two planar workpieces 61 and 62 are stacked is illustrated. These two workpieces 61 and 62 are supported on a supporting surface 16a of the backing member 16. Therefore, in Embodiment 1, as the backing member 16, a configuration having a flat supporting surface 16a that stably supports the two workpieces 61 and 62 is illustrated.

For convenience of explanation, of the two workpieces 61 and 62 supported on the supporting surface 16a, the workpiece 61 facing the rotary tools will be referred to as the front-side workpiece 61, and the workpiece 62 supported on the flat supporting surface 16a Will be referred to as the back-side workpiece 62. Further, the surface of the front-side workpiece 61 which faces the rotary tools will be referred to as an "obverse surface 60a" of the workpiece 60, and the surface of the back-side workpiece 62 which is supported on the supporting surface 16a will be referred to as a "reverse surface 60b" of the workpiece 60.

In the example shown in FIG. 1, the supporting surface 16a of the backing member 16 supports the reverse surface 60b of the workpiece 60 while the obverse surface 60a of the workpiece 60 faces the rotary tools (the pin member 11 and the shoulder member 12). If one surface of each of the two workpieces 61 and 62 is the first surface and the other surface is the second surface, the first surface of the front-side workpiece 61 is the obverse surface 60a. Further, the two workpieces 61 and 62 are overlapped such that the second surface of the front-side workpiece 61 comes into contact with the first surface of the back-side workpiece 62. Further, the second surface of the back-side workpiece 62 is the reverse surface 60h and is supported by the supporting surface 16a of the backing member 16.

Because the backing member 16 only needs to be positioned so as to face the rotary tools and the clamp member 13, the specific configuration provided for the friction stir spot welding device 10A is not particularly limited. For example, if the friction stir spot welding device 10A is configured to include a C-shaped frame, the rotary tools, the clamp member 13, the tool driving unit 15, and the like are provided on the upper portion of the C-shaped frame, and the backing member 16 is provided on the lower portion of the C-shaped frame so as to face the rotary tools, the clamp member 13, the tool driving unit 15, and the like. The backing member 16 may be fixed undetachably to the C-shaped frame or may be detachably attached.

The specific configuration of the friction stir spot welding device 10A according to Embodiment 1 is not particularly limited. As described above, the friction stir spot welding device 10A may have another known configuration as long as including the pin member 11 and the shoulder member 12, which are rotary tools, the clamp member 13, the tool driving unit 15, and the backing member 16. Further, if the hacking member 16 is detachable, the friction stir spot welding device 10A does not necessarily include the backing member 16.

For example, when the friction stir spot welding device 10A is applied to a robot device, the friction stir spot welding device 10A including the backing member 16 may be provided at the distal end of an arm of the robot device through a C-shaped frame. Alternatively, the robot device provided with the friction stir spot welding device 10A not provided with the backing member 16 and the robot device provided with the backing member 16 may be configured to face each othe.

The backing member 16 holds the workpiece 60 that performs friction stir spot welding with the rotary tools together with the clamp member 13. Therefore, the backing member 16 is also a holding jig of the friction stir spot welding device 10A. If the clamp member 13 is the first holding jig, the backing member 16 can be the second holding jig. As described above, the backing member 16 can be detachably provided for the friction stir spot welding device 10A, and the clamp member 13 may also be detachably provided for the friction stir spot welding device 10A In this case, the clamp member 13 and the backing member 16 can be a holding jig set for the friction stir spot welding device 10A.

The space region formed by the inclined surface 13b of the clamp member 13 and the obverse surface 60a of the workpiece 60 in the friction stir spot welding device 10A according to the present disclosure will be specifically described with reference to FIGS. 2A to 2C. For convenience of explanation, FIGS. 2A to 2C show the rotary tools and the clamp member 13 in the main configuration of the friction stir spot welding device 10A shown in FIG. 1, with the obverse surface 60a of the workpiece 60 being indicated by a dotted line.

Figure 2A:
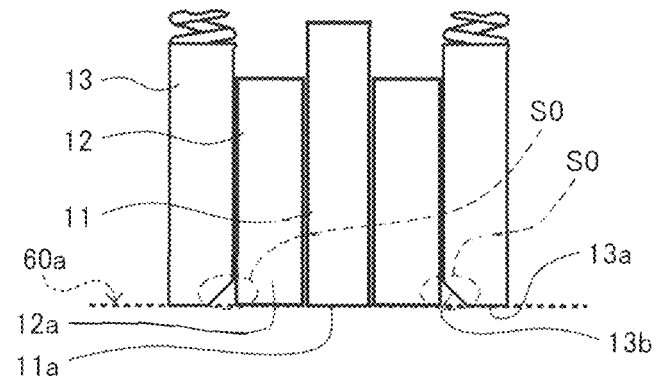
FIGS. 2A to 2C are schematic views for explaining space regions formed between the surface of a workpiece and the double-acting friction stir spot welding device shown in FIG. 1 by the forward/backward movement of the rotary tools.

As shown in FIGS. 1 and 2A, in the present embodiment, the inclined surface 13b of the clamp member 13 is configured as a tapered surface that is adjacent to the inner edge portion of the pressing surface 13a and expands toward the distal end side. As shown in FIG. 2A, assume that when the clamp member 13 presses the workpiece 60 by the pressing surface 13a, the pin member 11 and the shoulder member 12 are moved forward and backward to bring the shoulder contact surface 12a and the pin contact surface 11a into contact with the obverse surface 60a of the workpiece 60. In this state, a space region S0 surrounded by a broken line in FIG. 2A is formed between the inclined surface 13b, the outer peripheral surface of the shoulder member 12 and the obverse surface 60a of the workpiece 60.

If the clamp member 13 does not have the inclined surface 13b, even when the shoulder contact surface 12a comes into contact with the obverse surface 60a, substantially no gap is formed between the outer peripheral surface of the shoulder member 12 and the inner peripheral surface of the clamp member 13. Therefore, the space region S0 can be said to be a gap that is inevitably formed between the outer peripheral surface of the shoulder member 12 and the clamp member 13 when the clamp member 13 has the inclined surface 13b. Therefore, for the sake of convenience, the space region S0 will be referred to as the "gap region S0".

Figure 2B:
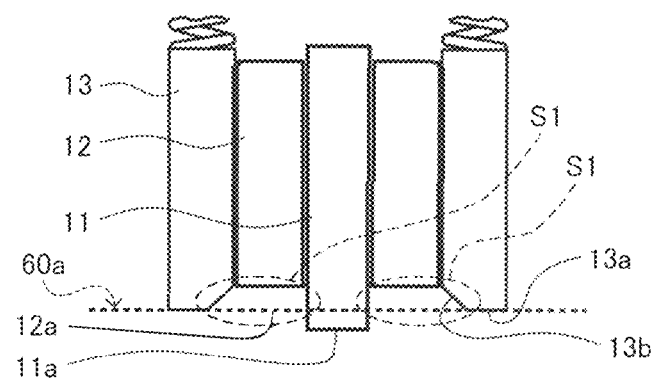
Figure 2C:
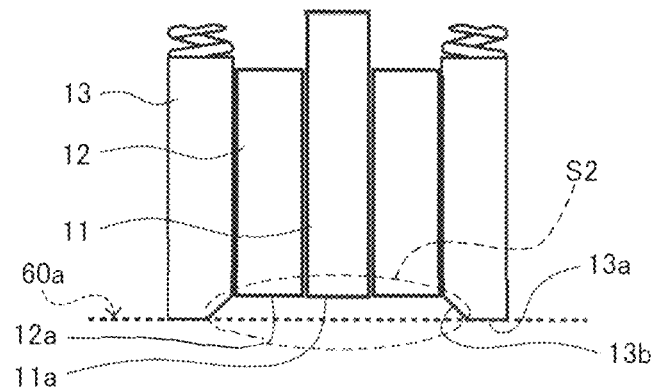

As shown in FIG. 2B, assume that when the clamp member 13 presses the workpiece 60 by the pressing surface 13a, the pin member 11 and the shoulder member 12 are moved forward and backward to press-fit (or bring) the pin contact surface 11a into (or into contact with) the obverse surface 60a and align the shoulder contact surface 12a with the upper edge of the inclined surface 13h of the clamp member 13. In this state, a space region S1 surrounded by a broken line in FIG. 2B is formed between the inclined surface 13b, the shoulder contact surface 12a, the outer peripheral surface of the pin member 11 and the obverse surface 60a of the workpiece 60.

In the space region S1, as described above, the pin contact surface 11a is press-fitted into the obverse surface 60a (or the pin member 11 may be in contact with the obverse surface 60a of the workpiece 60). Therefore, the shape of the space region S1 is an annular shape. When viewed from the obverse surface 60a, the space region S1 can be regarded as a concave region formed by the rotary tools and the clamp member 13. Therefore, for the sake of convenience, the space region S1 will be referred to as the "annular concave region S1".

As shown in FIG. 2C, assume that when the clamp member 13 presses the workpiece 60 by the pressing surface 13a, the pin member 11 and the shoulder member 12 are moved forward and backward to align not only the shoulder contact surface 12a but also the pin contact surface 11a with the upper edge of the inclined surface 13b of the clamp member 13, In this state, a space region S2 surrounded by a broken line in FIG. 2C is formed between the inclined surface 13h, the shoulder contact surface 12a, and the pin contact surface 11a and the obverse surface 60a of the workpiece 60.

In the space region S2, the pin contact surface 11a is not in contact with the obverse surface 60a, and the shoulder contact surface 12a and the pin contact surface 11a are substantially flush. In this state, the space region S2 is a concave region similar to the annular concave region S1, but its shape is not an annular shape but a circular shape. Therefore, for the sake of convenience, the space region S2 will be referred to as the "circular concave region S2".

In the present disclosure, at the lime of friction stir spot welding, the material constituting the workpiece 60 is filled into the annular concave region S1 shown in FIG. 2B or the circular concave region S2 shown in FIG. 2C, This makes it possible to thicken the welded portion formed on the workpiece 60 and form, at the thickened portion, the boundary (stirred portion boundary) between the stirred portion formed by friction-stirring the material with the rotary tools and the material (non-stirred portion) that is not stirred.

Friction Stir Spot Welding Method

A typical configuration of the friction stir spot welding method according to the present disclosure will be described in detail next with reference to FIGS. 3A to 3D, FIG. 4, and FIGS. 5A and 5B with the above friction stir spot welding device 10A taken as an example. Referring to FIGS. 3A to 3D, for convenience of explaining the forward/backward movement of the rotary tools, the contact surfaces 11a and 12a of the rotary tools and the pressing surface 13a of the clamp member 13 are not denoted by reference numerals.

Figure 3A:
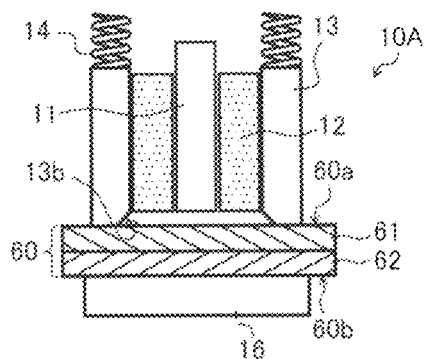
FIGS. 3A to 3D are views schematically illustrating steps in a double-acting friction stir spot welding method using the double-acting friction stir spot welding device shown in FIG. 1.

First, as shown in FIG. 3A, while the reverse surface 60b of the workpiece 60 is supported by the backing member 16, the obverse surface 60a of the workpiece 60 is pressed by the pressing surface 13a of the clamp member 13. As a result, the workpiece 60 (the front-side workpiece 61 and the back-side workpiece 62) is sandwiched between the clamp member 13 and the backing member 16. In Embodiment 1, because the clamp member 13 is provided with the spring 14, the contraction of the spring 14 causes a clamping force to press the workpiece 60.

The rotary tools are moved forward to bring the pin contact surface 11a and the shoulder contact surface 12a into contact with the obverse surface 60a, and the pin member 11 and the shoulder member 12 are rotated. In this state, neither the pin member 11 nor the shoulder member 12 moves back and forth, so that the obverse surface 60a of the workpiece 60 is "preliminarily heated", With this operation, in the contact region of the front-side workpiece 61, friction generates heat in the material. As a result, the material is softened and stirred. Note that the region where the material is softened and stirred in this way is called a "stirred portion".

Figure 3C:
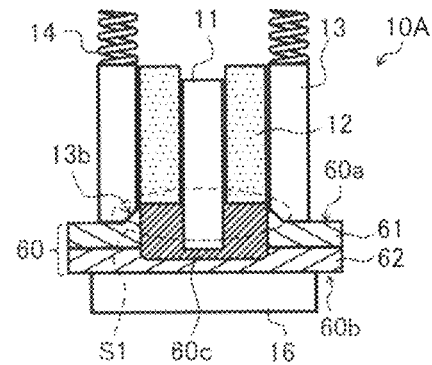
Figure 3B:
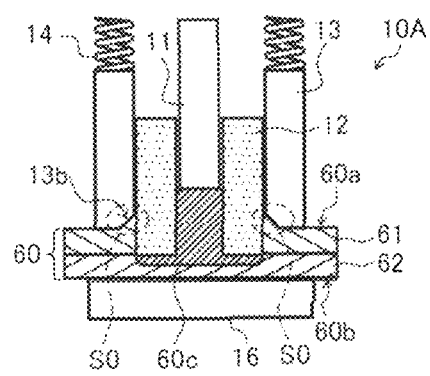

Next, as shown in FIG. 3B, the shoulder member 12 is made relatively protruded from the pin member 11 to further advance (press-fit) the shoulder member 12 into the obverse surface 60a. As a result, the stirred portion 60c is formed in not only the front-side workpiece 61 but also the back-side workpiece 62. When the shoulder member 12 is further press-fitted, the material of the stirred portion 60c is pushed away and flows from directly below the shoulder member 12 to directly below the pin member 11, so that the pin member 11 moves backward and rises as seen from the shoulder member 12.

At this time, as shown in FIG. 31B, the stirred portion 60c is substantially generated only below the rotary tools (the portions where the contact surfaces 11a and 12a are in contact). Therefore, although the material is not stirred at a region around the stirred portion 60c, the material itself is softened to some extent by the heat generated by friction at the region. If such a material is a "non-stirred softened material", when the shoulder member 12 is press-fitted into the workpiece 60, the non-stirred softened material is pushed out of the shoulder member 12 at a region around the stirred portion 60c. Therefore, as indicated by a broken line in FIG. 3B, a non-stirred softened material is filled into the gap region S0 generated between the outer peripheral surface of the shoulder member 12 and the inclined surface 13b.

Next, as shown in FIG. 3C, the shoulder member 12 that has been press-fitted is gradually retracted (pulled in), and the pin member 11 is advanced (press-fitted) into the workpiece 60. As a result, in the stirred portion 60c, the material is pushed away from directly below the pin member 11, so that the pushed-away material flows toward the obverse surface 60a as the shoulder member 12 moves backward. Retracting the shoulder member 12 until the shoulder contact surface 12a is aligned with the upper edge of the inclined surface 13b can fill the entire annular concave region S1 with the material, as indicated by a broken line in FIG. 3C.

Figure 3D:
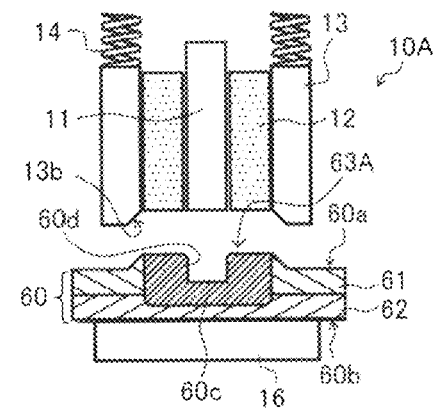

Thereafter, as shown in FIG. 3D, the pin member 11 is retracted (pulled in) to form a concave portion 60d in the stirred portion 60c derived from press-fit of the pin member 11. Because the material corresponding to the volume of the concave portion 60d fills the annular concave region S1, a region (thick region) thicker than the entire workpiece 60 is formed on the welded portion 63A of the front-side workpiece 61 and the back-side workpiece 62. Thereafter, by releasing the pressing by the clamp member 13, a series of operations in the fiction stir spot welding method is completed.

Figure 4:
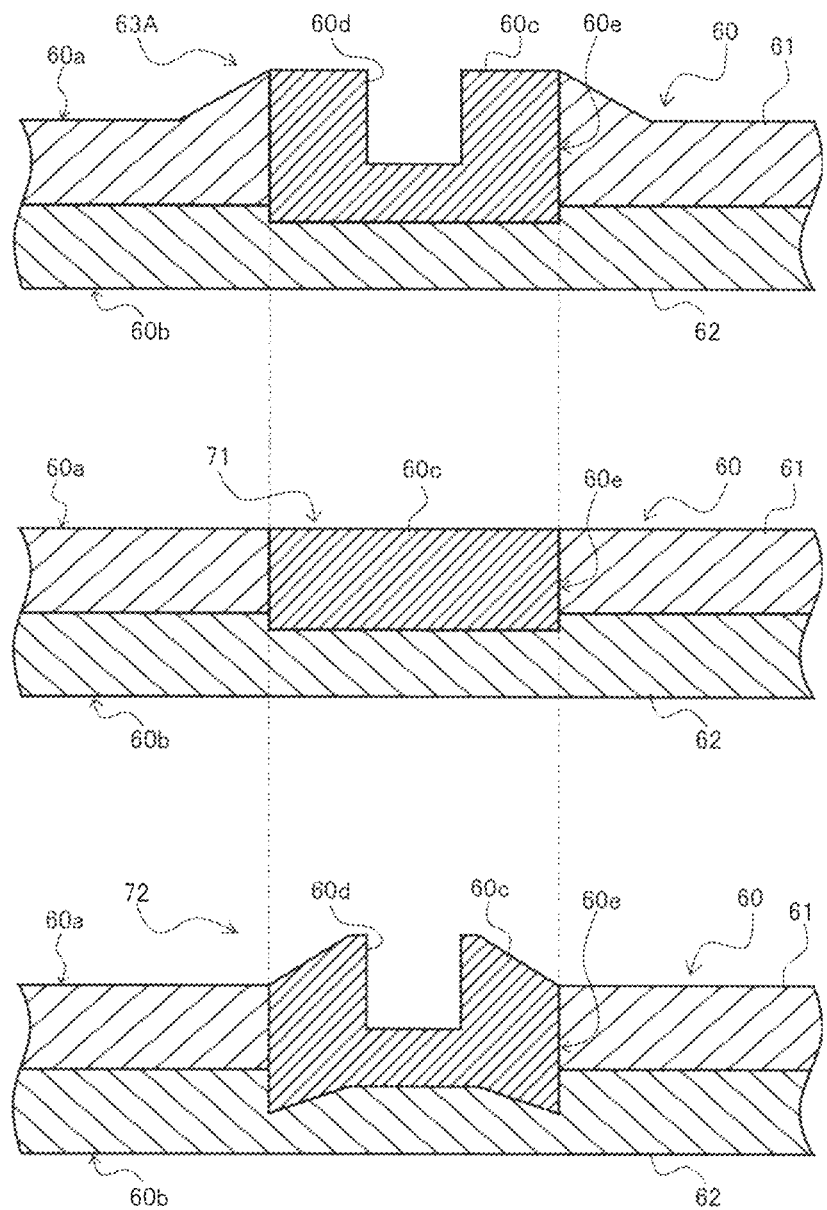
FIG. 4 illustrates schematic sections comparatively showing a configuration example of a welded portion according to Embodiment 1 formed by the double-acting friction stir spot welding method shown in FIGS. 3A to 3D, a configuration example of a conventional welded portion formed by a conventional double-acting friction stir spot welding method, and a configuration example of a comparative welded portion formed by a comparative method.

The welded portion 63A formed by such a friction stir spot welding method is thicker than the entire workpiece 60, as schematically shown in the upper diagram of FIG. 4. In addition, in the welded portion 63A, a stirred portion boundary 60e, which is a boundary between the stirred portion 60c where the material is stirred and the non-stirred portion where the material is not stirred, is located in the thick region. On the other hand, in a welded portion (conventional welded portion) 71 formed by the conventional friction stir spot welding method schematically shown in the middle diagram of FIG. 4, a concave portion 60d derived from the pin member 11 is backfilled and shaped substantially flat without no thick region formed.

Therefore, according to the fiction stir spot welding method (and the friction stir spot welding device 10A) according to the present disclosure, a simple configuration in which the inclined surface 13b is provided on the clamp member 13, as compared with the conventional friction stir spot welding method, can selectively increase the thickness at the welded portion 63A. Moreover, the material that increases the thickness is supplemented by forming the concave portion 60d in the center of the welded portion 63A by press-fitting the pin member 11. Therefore, the thickness of the welded portion 63A can be selectively increased without increasing the weight, so that the strength of the welded portion 63A can be improved.

In this case, it is conceivable to selectively increase the thickness of the welded portion 63A by providing an inclined surface on the contact surface 12a of the shoulder member 12 instead of providing the inclined surface 13b on the clamp member 13. However, when an inclined surface is provided on the shoulder contact surface 12a, a comparative welded portion 72 as schematically shown in the lower diagram of FIG. 4 is formed. At first glance, this comparative welded portion 72 is similar to the welded portion 63A shown in the upper diagram of FIG. 4, but the stirred portion boundary 60e is not located at the thick region of the comparative welded portion 72 and is formed near the boundary between the comparative welded portion 72 and the portion that is not welded. As a result, the comparative welded portion 72 cannot sufficiently improve the strength even with the increased thickness.

Figure 5A:
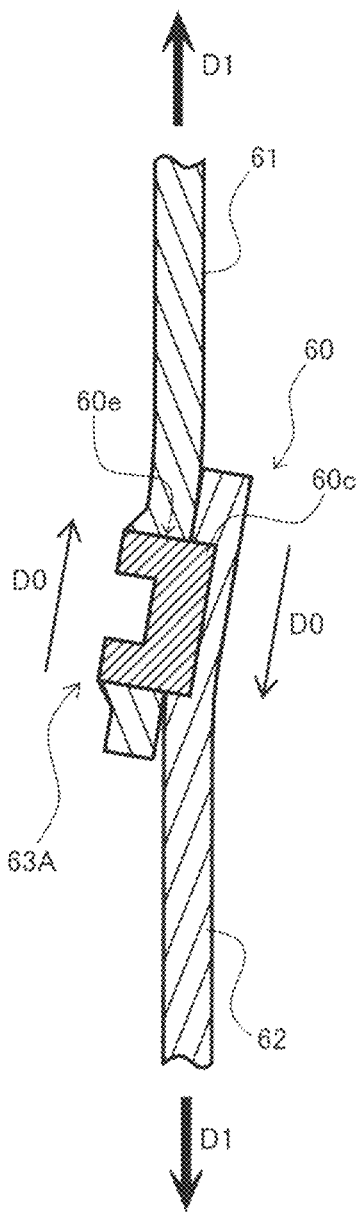
FIG. 5A is a schematic view for explaining a state in which tensile loads are applied from both ends of a workpiece including the welded portion according to Embodiment 1 shown in FIG. 4.

Using either the conventional welded portion 71 shown in the middle diagram of FIG. 4 or the comparative welded portion 72 shown in the lower diagram of FIG. 4 makes it possible to firmly weld the front-side workpiece 61 and the back-side workpiece 62. However, according to the study by the present inventors, as shown in FIGS. 5A and 5B, it has been clear that when the conventional welded portion 71 or the comparative welded portion 72 is formed in the joint structure of the workpieces 61 and 62, the occurrence of bending in the joint region may reduce the strength.

Figure 5B:
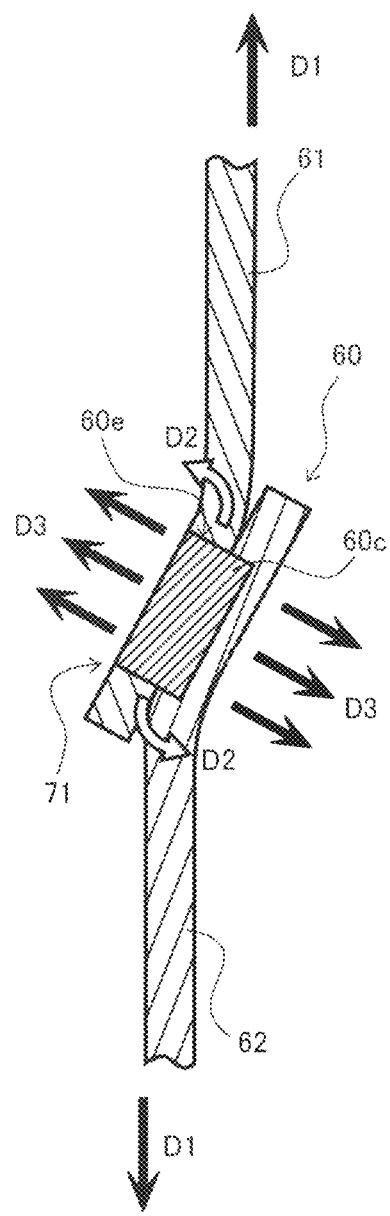
FIG. 5B is a schematic view for explaining a state in which tensile loads are applied from both ends of a workpiece including the conventional welded portion shown in FIG. 4.

For example, referring to FIG. 5B, one end of the strip-like front-side workpiece 61 is stacked on one end of the strip-like back-side workpiece 62 to form the conventional welded portion 71, thereby forming the joint structure of the workpieces 61 and 62. When a load is applied to such a joint structure so as to pull the other end of each of the front-side workpiece 61 and the back-side workpiece 62 as indicated by an arrow D1, bending occurs in the joint region (conventional welded portion 71) as indicated by an arrow D2, resulting in the occurrence of a load that peels off the front-side workpiece 61 from the back-side workpiece 62 at the joint region, as indicated by an arrow D3 in FIG. 5B. As a result, the strength of the joint region, particularly the fatigue strength, decreases, and for example, breakage is likely to occur at the stirred portion boundary 60e.

In contrast, in the friction stir spot welding method according to the present embodiment, as shown in the upper diagram of FIG. 4, the thickness of the welded portion 63A is large. Accordingly, because the rigidity of the welded portion 63A increases, as shown in FIG. 5A, even when a tensile load is applied in the direction of the arrow D1, it is possible to suppress the occurrence of bending around the welded portion 63A. Accordingly, a tensile shear load occurs near the welded portion 63A, as indicated by an arrow D0, and a peeling load is less likely to occur as indicated by the arrow D3 in FIG. 5B. Therefore, it is possible to effectively suppress a reduction in the strength of the joint region. Moreover, because the stirred portion boundary 60e is located at the thick region of the welded portion 63A, the strength of the stirred portion boundary 60e can be improved. Because the stirred portion boundary 60e is a region where stress is most concentrated in the load form described above, the relaxation of the stress acting on the stirred portion boundary 60e contributes to an improvement in strength as a point.

Accordingly, in the friction stir spot welding device 10A or the friction stir spot welding method according to the present disclosure, or the holding jig or holding jig set for friction stir spot welding, the tapered inclined surface 13b is formed inside the pressing surface 13a of the clamp member 13 that is a holding jig. Therefore, by aligning the contact surface 12a of the shoulder member 12 with the upper edge of the inclined surface 13b, the annular concave region S1 whose periphery is covered with the clamp member 13 can be formed at the distal end portions of the rotary tools. By moving the rotary tools forward and backward with respect to the workpiece 60, a material constituting the workpiece 60 can be filled into the entire annular concave region S1.

In particular, the press-fitting of the shoulder member 12 stirs the material located immediately below the shoulder contact surface 12a, whereas the surrounding material adjacent to the shoulder contact surface 12a is not stirred but softens to some extent. Accordingly, not only the material stirred with the press-fitting of the shoulder member 12 but also the surrounding softened material can be filled into the annular concave region S1.

By using the material filled in the annular concave region S1, a thick region having an increased thickness is formed in the welded portion 63A of the workpiece 60 and the boundary (stirred portion boundary 60e) between the portion where the material is stirred and the portion where the material is not stirred is located at the thick region. The stirred boundary portion is a stress concentration portion and is a region that tends to be a starting point of fracture. Therefore, the rigidity of the welded portion 63A can be improved, and the possibility of breakage at the stirred portion boundary 60e can be effectively suppressed. As a result, it is possible to further improve the strength of for example, the joint portion of the workpiece 60.

Embodiment 2

In Embodiment 1, the thick region of the welded portion 63A is configured to increase the thickness of the workpiece 60 on the obverse surface 60a side. However, the thickness of the workpiece 60 on the reverse surface 60b side may be increased.

[Friction Stir Spot Welding Device]

Figure 6:
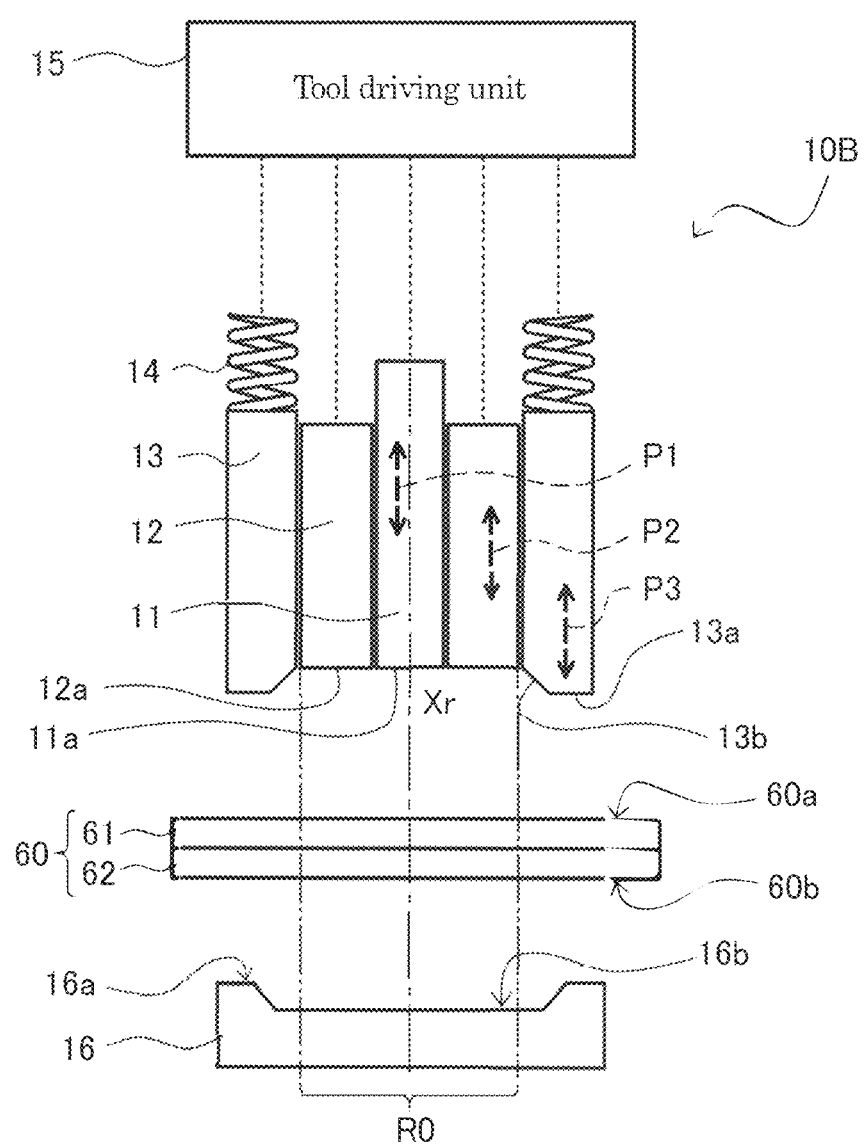
FIG. 6 is a schematic diagram showing the configuration of the main part of a double-acting friction stir spot welding device according to Embodiment 2 of the present application.

The configuration of the main part of a friction stir spot welding device according to Embodiment 2 will be described first with reference to FIG. 6. As schematically shown in FIG. 6, like the friction stir spot welding device 10A according to Embodiment 1, a friction stir spot welding device 10B according to Embodiment 2 includes, as main components, a pin member 11 and a shoulder member 12 (rotary tools), a clamp member 13 (holding jig), a spring 14, a tool driving unit 15, and a backing member 16 (holding jig). However, the backing member 16 according to Embodiment 2 is provided with a supporting surface concave portion 16b as shown in FIG. 6.

The supporting surface concave portion 16b is a circular concave portion provided in the supporting surface 16a of the backing member 16. The peripheral edge portion of the supporting surface concave portion 16b is an inclined surface that inclines so as to reduce the diameter from the supporting surface 16a in the depth direction. Note that the inclined surface of the peripheral edge portion of the supporting surface concave portion 16b is referred to as a "concave-portion peripheral-edge inclined surface" for convenience of distinguishing from the inclined surface 13b of the clamp member 13. The position where the supporting surface concave portion 16b is provided in the supporting surface 16a is not particularly limited and may be a position where a thick region can be formed on the reverse surface 60b side of the welded portion of the workpiece 60.

A typical example of the position where the supporting surface concave portion 16b is provided will be described. The supporting surface concave portion 16b is configured as a flat bottomed hole such that the diameter at the bottom surface is the smallest and the diameter at the opening on the supporting surface 16a side is the largest. As shown in FIG. 6, assume that the position (indicated by a two-dot chain line in FIG. 6) where the pin member 11 and the shoulder member 12 as rotary tools advance toward the backing member 16 and come into contact with the backing member 16 is a "tool contact position R0". In this case, the supporting surface concave portion 16b needs to be located such that the bottom surface of the supporting surface concave portion 16b coincides with the tool contact position R0 or such that the tool contact position R0 is completely included in the bottom surface.

Although it is sufficient that the supporting surface concave portion 16b is located such that the tool contact position R0 is completely included in the bottom surface of the supporting surface concave portion 16b as described above, as shown in FIG. 6, the center of the bottom surface (in other words, the center of the supporting surface concave portion 16h) preferably substantially coincides with an axis Xr (the chain line in the FIG. 6) of the rotary tools. As will be described later, the thick region of the welded portion of the workpiece 60 is formed by filling the supporting surface concave portion 16b with a material by moving the rotary tools (the pin member 11 and the shoulder member 12) forward and backward. Therefore, by keeping the center of the bottom surface coincident with the axis Xr, the supporting surface concave portion 16b can be entirely filled with a material.

The size of the supporting surface concave portion 16b is not particularly limited, but the bottom surface needs to be as large as the tool contact position R0. Because the tool contact position R0 substantially corresponds to contact surfaces 11a and 12a of the rotary tools, the bottom surface of the supporting surface concave portion 16b needs to have approximately the same size as the pin contact surface 11a and the shoulder contact surface 12a. In other words, the bottom surface of the supporting surface concave portion 16b needs to have approximately the same diameter as the diameter of the shoulder member 12. Therefore, the concave-portion peripheral-edge inclined surface of the supporting surface concave portion 16b is located outside the tool contact position R0. Accordingly, as will be described later, a gap region similar to the gap region S0 (see FIG. 2A) in Embodiment 1 can be formed from the concave-portion peripheral-edge inclined surface and the outer peripheral surface of the shoulder member 12.

The depth of the supporting surface concave portion 16b, the expanding width of the concave-portion peripheral-edge inclined surface, the inclination angle of the concave-portion peripheral-edge inclined surface, the width of the concave-portion peripheral-edge inclined surface, and the like are not particularly limited, Like the respective numerical values of the inclined surface 13b of the clamp member 13, these numerical values can be appropriately set in accordance with various conditions required for the welded portion formed on the workpiece 60, especially the thickness of the thick region formed on the reverse surface 60b.

In addition, the specific configuration of the concave-portion peripheral-edge inclined surface is not particularly limited as long as it is a surface inclined so as to reduce the diameter from the supporting surface 16a in the depth direction, as described above. Therefore, the concave-portion peripheral-edge inclined surface may be alit surface (planar surface) as schematically shown in FIG. 6 or a curved surface, similar to the inclined surface 13b of the clamp member 13 described above. Further, the concave-portion peripheral-edge inclined surface may be configured by a single plane as shown in FIG. 6, but may be configured by a plurality of planes adjacent to each other or a plurality of curved surfaces adjacent to each other, or may be configured to include both a flat surface and a curved surface.

Further, the friction stir spot welding device 10B according to Embodiment 2 has the same configuration as that of the friction stir spot welding device 10A according to Embodiment 1 except for the configuration of the backing member 16, and hence a description of the same configuration will be omitted.

Friction Stir Spot Welding Method

A typical configuration of the friction stir spot welding method according to Embodiment 2 will be described in detail next with reference to FIGS. 7A to 7E, FIGS. 8A to 8E, and FIGS. 9A and 9B with the above friction stir spot welding device 10B taken as an example. Referring to FIGS. 7A to 7E or FIGS. 8A to 8E, like FIGS. 3A to 3D referred to in Embodiment 1, for convenience of explaining the forward/backward movement of the rotary tools, the contact surfaces 11a and 12a of the rotary tools and the pressing surface 13a of the clamp member 13 are not denoted by reference numerals.

Figure 7A:
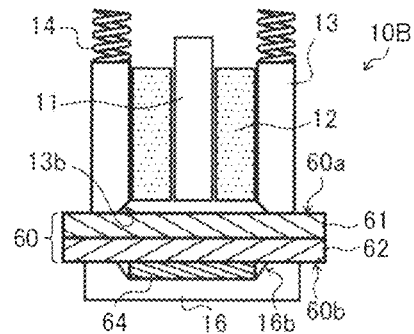
FIGS. 7A to 7E are views schematically illustrating an example of steps in a double-acting friction stir spot welding method using the double-acting friction stir spot welding device shown in FIG. 6.

In the friction stir spot welding method according to Embodiment 2, unlike Embodiment 1, because the supporting surface concave portion 16b is also formed in the backing member 16, in the welded portion of the workpiece 60, not only an obverse surface 60a but also a reverse surface 60h increases in thickness. Therefore, in Embodiment 2, for example, as schematically shown in FIG. 7A, before the workpiece 60 is partially stirred, an additional material 64 of the same type as the workpiece 60 is provided at a region to be stirred. At the time of stirring with the rotary tools, not only the workpiece 60 but also the additional material 64 is stirred together to supplement the additional material 64 for an increase in the thickness of the reverse surface 60b.

In Embodiment 2, as in Embodiment 1 described above, as shown in FIG. 7A, while the reverse surface 60b of the workpiece 60 is supported by the backing member 16, the obverse surface 60a of the workpiece 60 is pressed by the pressing surface 13a of the clamp member 13. As a result, the workpiece 60 (the front-side workpiece 61 and the back-side workpiece 62) is sandwiched between the clamp member 13 and the backing member 16. At this time, in Embodiment 2, the additional material 64 is supplied to the supporting surface concave portion 16b.

The additional material 64 is basically the same as the material constituting the workpiece 60, but may be a different material as long as it can be mixed with the material constituting the workpiece 60 by stirring with the rotary tools. By selecting a different material as the additional material 64, it becomes possible to impart characteristics that the workpiece 60 does not have (for example, high strength or high corrosion resistance) to the welded portion.

The form of the additional material 64 is not particularly limited, and the additional material 64 may have a plate shape or block shape as schematically shown in FIG. 7A or other shapes, or may be a particulate, powdery, or other material. However from the viewpoint of favorably supporting the reverse surface 60b of the workpiece 60 by the backing member 16, the additional material 64 is desirably in a form that can be accommodated in the supporting surface concave portion 16b (or a size that can be accommodated).

The obverse surface 60a of the workpiece 60 is "preliminarily heated" with the rotary tools (the pin member 11 and the shoulder member 12) as in Embodiment 1 described above. As shown in FIG. 7B, the shoulder member 12 is made relatively protruded from the pin member 11 to further advance (press-fit) the shoulder member 12 into the obverse surface 60a. As a result, the stirred portion 60c is formed in not only the front-side workpiece 61 but also the back-side workpiece 62.

When the shoulder member 12 is further press-fitted, the matenal of the stirred portion 60c is pushed away and flows from directly below the shoulder member 12 to directly below the pin member 11, so that the pin member 11 moves backward and rises as seen from the shoulder member 12. Further, the press-fitting of the shoulder member 12 causes the non-stirred softened material to be pushed outward at the portion around the stirred portion 60c. Therefore, as indicated by a broken line in FIG. 7B, a non-stirred softened material is filled into the gap region S0 generated between the outer peripheral surface of the shoulder member 12 and the inclined surface 13b.

Figure 7D:
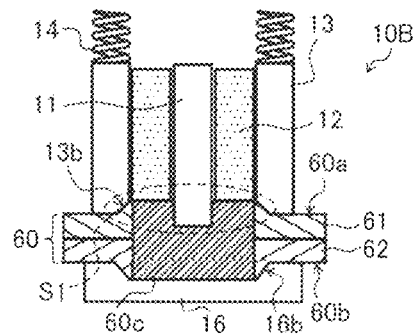
Figure 7B:
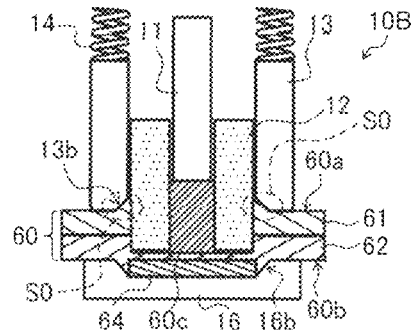
Figure 7E:
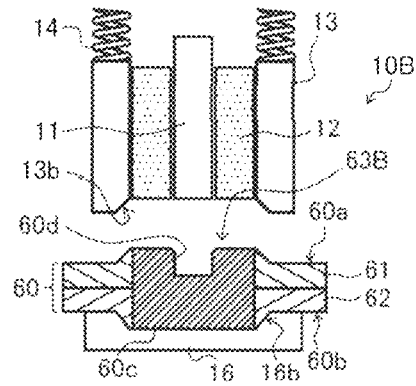
Figure 7C:
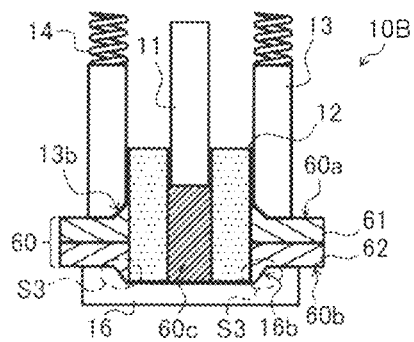

As shown in FIG. 7C, the shoulder member 12 is further press-fitted to reach the vicinity of the bottom surface of the supporting surface concave portion 16b. As a result, not only the workpiece 60 but also the additional material 64 is stirred, so that the softened additional material 64 is joined with the stirred portion 60c formed by stirring the workpiece 60.

When the shoulder member 12 reaches the vicinity of the bottom surface of the supporting surface concave portion 16b, the peripheral edge portion of the supporting surface concave portion 16b serves as the concave-portion peripheral-edge inclined surface similar to the inclined surface 13b of the clamp member 13. Therefore, a gap region S3, which s a space region similar to the gap region S0, is formed between the concave-portion peripheral-edge inclined surface and the outer peripheral surface of the shoulder member 12, as indicated by a broken line in FIG. 7C. As the shoulder member 12 is press-fitted, the non-stirred softened material is pushed outward at near the stirred portion 60c. Therefore, the gap region S3 is also filled with the non-stirred softened material.

Next, as shown in FIG. 7D, the shoulder member 12 that has been press-fitted is gradually retracted (pulled in). As a result, the shoulder member 12 present in the supporting surface concave portion 16b moves out of the supporting surface concave portion 16b, so that the supporting surface concave portion 16b is entirely filled with the material of the stirred portion 60c. Further, as the shoulder member 12 moves backward, the pin member 11 enters (is press-fitted into) the workpiece 60. As a result, the material of the stirred portion 60c is pushed away from immediately below the pin member 11 and flows toward the obverse surface 60a Retracting the shoulder member 12 until the shoulder contact surface 12a is aligned with the upper edge of the inclined surface 13b fills the entire annular concave region S1 with the material, as indicated by a broken line in FIG. 7D.

Thereafter as shown in FIG. 7E, the pin member 11 is retracted (pulled in) to form a concave portion 60d in the stirred portion 60c derived from press-fit of the pin member 11. The material corresponding to the volume of the concave portion Cod fills the annular concave region S1 located on the obverse surface 60a. As described above, the supply of the additional material 64 also fills the supporting surface concave portion 16b located on the reverse surface 60b with the material. Thereafter, by releasing the pressing by the clamp member 13, a series of operations in the friction stir spot welding method is completed.

Figure 8A:
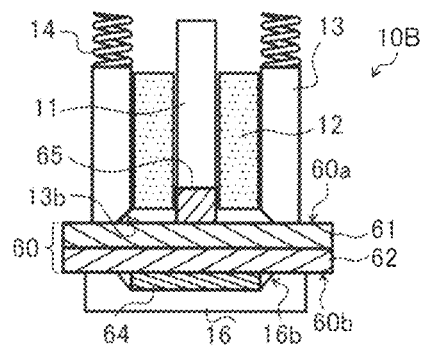
FIGS. 8A to 8E are views schematically illustrating another example of steps in a double-acting friction stir spot welding method using the double-acting friction stir spot welding device shown in FIG. 6.

In the friction stir spot welding method illustrated in FIGS. 7A to 7E, the additional material 64 is supplied only to the reverse surface 60b side, but an additional material 65 can also be supplied to the obverse surface 60a. In this case, the concave portion 60d derived from the pin member 11 can be backfilled and shaped substantially flat. For example, as shown in FIG. 8A, the additional material 65 is supplied to a position on the obverse surface 60a of the workpiece 60 and immediately below the pin member 11. In FIG. 8A, as in the state shown in FIG. 7A, the additional material 64 is supplied to the supporting surface concave portion 16b of the backing member 16.

Figure 8D:
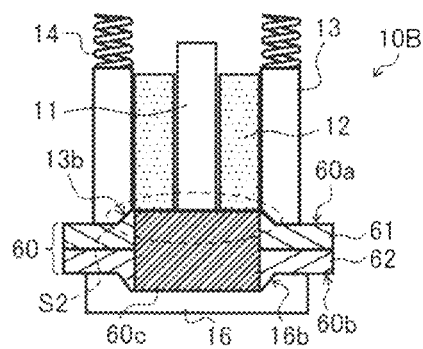
Figure 8B:
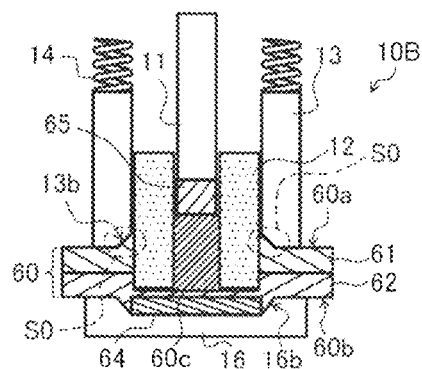
Figure 8E:
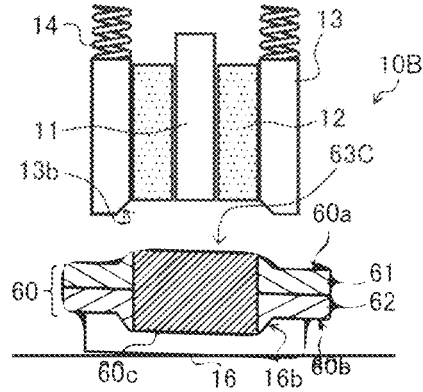
Figure 8C:
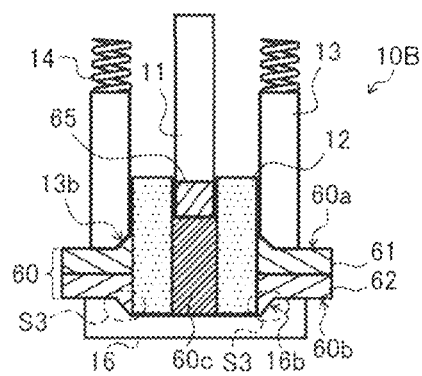

As shown in FIGS. 8B and 8C, the shoulder member 12 is advanced (press-fitted), and a non-stirred softened material is filled in the gap region S0 (see the region surrounded by the broken lines in FIG. 8B) formed between the outer peripheral surface of the shoulder member 12 and the inclined surface 13b and the gap region S3 (see the region surrounded by the broken lines in FIG. 8C) formed between the outer peripheral surface of the shoulder member 12 and the concave-portion peripheral-edge inclined surface, as in the state shown in FIGS. 7B and 7C. In addition, the softened additional material 64 is joined in the stirred portion 60c.

Thereafter similarly to the state shown in FIG. 7D, the press-fitted shoulder member 12 is gradually retracted to fill the entire supporting surface concave portion 16b with the material of the stirred portion 60c. Further, as the shoulder member 12 moves backward, the pin member 11 enters (is press-fitted into) the workpiece 60. At this time, the additional material 65 is stirred and softened by the pin member 11, and joined in the stirred portion 60c.

Thereafter, as shown in FIG. 8D, the pin member 11 and the shoulder member 12 are retracted until the pin contact surface 11a and the shoulder contact surface 12a are aligned with the upper edge of the inclined surface 13b.

As a result, as indicated by the broken line in the FIG. 8D, the inclined surface 13b of the clamp member 13, the pin contact surface 11a, and the shoulder contact surface 12a form the circular concave region S2 (see the lower diagram of FIG. 4). Therefore, the material of the stirred portion 60c supplemented with the additional material 65 fills the entire circular concave region S2, as indicated by the broken line in FIG. 8D. As shown in FIG. 8E, by releasing the pressing by the clamp member 13, a series of operations in the friction stir spot welding method is completed.

Figure 9A:
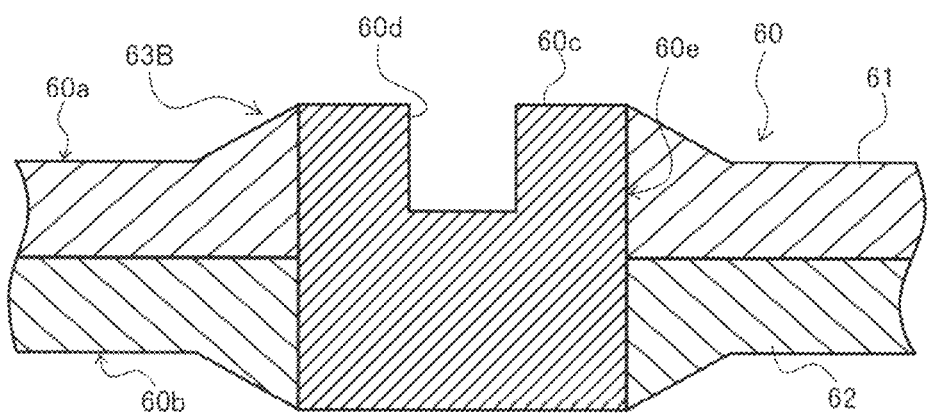
FIG. 9A is a schematic cross-sectional view showing a configuration example of a welded portion according to Embodiment 2 formed by the double-acting friction stir spot welding method shown in FIGS. 8A to 8E.
Figure 9B:
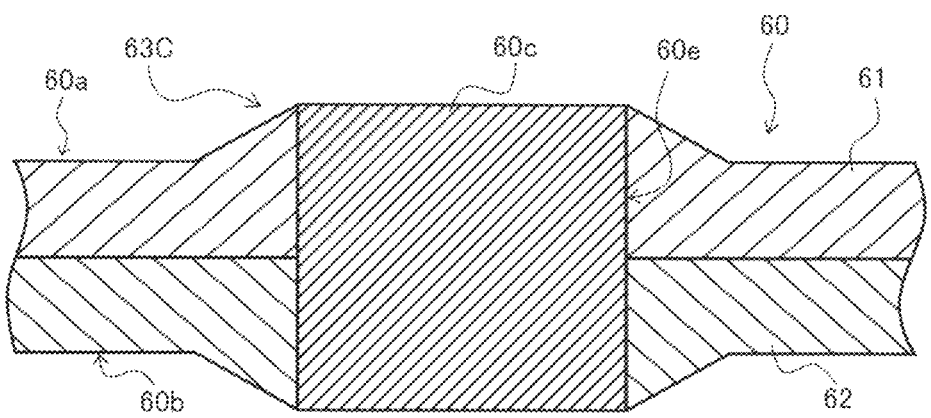
FIG. 9B is a schematic cross-sectional view showing another configuration example of the welded portion according to Embodiment 2 formed by the double-acting friction stir spot welding method shown in FIGS. 8A to 8E.

As shown schematically in FIG. 9A or FIG. 9B, a welded portion 63B or a welded portion 63C formed by the friction stir spot welding method as described above has thick regions with increased thicknesses on both the obverse surface 60a and the reverse surface 60b. In addition, the concave portion 60d derived from the pin member 11 remains in the welded portion 63B, but the concave portion 60d does not remain in the welded portion 63C, and the obverse surface 60a is shaped substantially flat. In addition, in each of the welded portion 63B and the welded portion 63C, a stirred portion boundary 60e, which is the boundary between the stirred portion 60c where the material is stirred and the non-stirred portion where the material is not stirred is located at the thick region.

Therefore, according to the friction stir spot welding method (and the friction stir spot welding device 10B) according to the present disclosure, a simple configuration in whiCh the inclined surface 13b is provided on the clamp member 13 and the supporting surface concave portion 16b is provided on the supporting surface 16a of the backing member 16 can selectively increase the thickness at the welded portion 63B or 63C. Further, regarding the materials for increasing the thickness, the reverse surface 60h side can be supplemented by the additional material 64, whereas the obverse surface 60a can be supplemented by the concave portion 60d formed in the center of the welded portion 63A by press-fitting the pin member 11 as in Embodiment 1 described above, and can be further supplemented by the additional material 65.

Thus, if the thickness can be selectively increased at the welded portion 63B or 63C, the increase in weight can be minimized even when the additional material 64 or 65 is supplied. In addition, because the thickness increases on both the obverse surface 60a and the reverse surface 60b, even when a bending load is applied to the welded portion 63B or 63C upon application of the welded portion 63B or 63C to the welding of the joint structure, the strength reduction can be effectively suppressed. In addition, as described above, because the stirred portion boundary 60e is located at the thick region at either the welded portion 63B or 63C, the strength of the stirred portion boundary 60e is improved, and the breakage at this region can be effectively suppressed.

Modification

In Embodiment 2, the additional material 64 or 65 is supplied before the workpiece 60 is stirred by the rotary tools. However, this is not exhaustive. The additional material 64 or 65 may be supplied after the workpiece 60 is welded. For example, in Embodiment 1 described above, after the welded portion 63A is formed (see, for example, the upper diagram of FIG. 4), the additional material 65 may be supplied to the obverse surface 60a in order to backfill the concave portion 60d, and welding may be performed again by the rotary tools. Similarly, for example, after the welded portion 63A is formed on the workpiece 60, the additional material 64 may be supplied to the reverse surface 60b and the workpiece 60 may be welded again by the rotary tools.

That is, the additional material 64 or 65 may be supplied to the region to be stirred in the workpiece 60 (supplied before welding) or supplied to the welded portion 63A, 63B, or 63C formed on the workpiece 60 (supplied after welding). However, when the additional material 64 is supplied to the reverse surface 60b, depending on various conditions, it is preferable to supply the material to the supporting surface concave portion 16b before welding as described in Embodiment 2. By supplying the additional material 64 before welding, the additional material 64 is made to exist in the supporting surface concave portion 16b, so that the possibility that the workpiece 60 bends during press-fitting of the rotary tools can be prevented or suppressed.

In the example shown in FIG. 7C or FIG. 5C, the additional material 64 is stirred by the shoulder member 12. In the example shown in FIG. 5D, the additional material 65 is stirred by the pin member 11. However, the method of stirring the additional material 64 or 65 is not limited to this, and the stirring may be performed by at least one of the pin member 11 and the shoulder member 12. Further, the method of supplying the additional material 64 or 65 is not particularly limited. For example, as described in Embodiment 2, the additional material 64 or 65 may be supplied so as to come into contact with at least the obverse surface 60a or the reverse surface 60b of the workpiece 60.

Note that the concave portion 60d derived from the pin member 11 remains in both the welded portion 63A in Embodiment 1 and the welded portion 63B in Embodiment 2. The concave portion 60d basically does not affect the strength of the welded portion 63A. Therefore, it is not essential to backfill the concave portion 60d by supplying the additional material 65. Depending on the use of the workpiece 60, it may be better that the concave portion 60d does not exist. In such a case, the concave portion 60d is backfilled to shape the obverse surface 60a into a substantially flat shape like the welded portion 63C.

In both Embodiment 1 and Embodiment 2, the present disclosure is described with the friction stir spot welding device 10A or 10B using the clamp member 13 having the inclined surface 13b on the pressing surface 13a taken as an example. However, the present disclosure is not limited to the friction stir spot welding device 10A or 10B or the friction stir spot welding method using them. As described in Embodiment 1, the clamp member 13 may be detachably mounted on the friction stir spot welding device 10A for the friction stir spot welding device 10B), The clamp member 13 is a holding jig for holding the workpiece 60. Therefore, the present disclosure also includes the clamp member 13 having the inclined surface 13b, that is, a friction stir spot welding holding jig.

As described in Embodiment 1, the backing member 16 may be detachably mounted on the friction stir spot welding device 10A (or the friction stir spot welding device 10B). The backing member 16 is a holding jig that holds the workpiece 60. Therefore, the present disclosure also includes a friction stir spot welding holding jig set including the clamp member 13 as a first holding jig and the backing member 16 as a second holding jig. At this time, the backing member 16 may have the configuration described in Embodiment 1, but the backing member 16 having the supporting surface concave portion 16h described in Embodiment 2 is more preferable.

As described above, a holding jig for double-acting friction stir spot welding according to the present disclosure may be a holding jig which is used for a friction stir spot welding device for welding a workpiece by partially stirring the workpiece with rotary tools and is configured to hold the workpiece. The friction stir spot welding device may include, as the rotary tools, a cylindrical pin member that is configured to rotate around an axis and be movable forward and backward along the axis and a cylindrical shoulder member that is positioned so as to surround an outside of the pin member and is configured to rotate around the axis of the pin member and be movable forward and backward along the axis. The holding jig may be a clamp member that has a cylindrical shape positioned so as to surround an outside of the shoulder member and is configured to press the workpiece from an obverse surface with an annular pressing surface of a distal end of the clamp member. The clamp member may have an inclined surface that is adjacent to an inner edge portion of the pressing surface and inclined so as to reduce an inner diameter of the clamp member toward a back side as viewed from the pressing surface.

According to the above configuration, a tapered inclined surface is formed inside the pressing surface of the clamp member, and a concave region whose periphery is covered with the clamp member is formed on the distal end portions of the rotary tools by aligning the contact surface of the shoulder member with the upper edge of the inclined surface. By moving the rotary tool forward and backward with respect to the workpiece in this state, the entire concave region can be filled with the material constituting the workpiece.

In particular, the press-fitting of the shoulder member stirs the material located immediately below the contact surface of the shoulder member, whereas the surrounding material adjacent to the contact surface of the shoulder member is not stirred but softened to some extent. Accordingly, not only the material stirred with the press-fitting of the shoulder member but also the surrounding softened material can be filled into the concave region.

By using the material filled in the concave region; a thick region having an increased thickness is formed in the welded portion of the workpiece and the boundary (stirred portion boundary) between the portion where the material is stirred and the portion where the material is not stirred is located at the thick region. The stirred boundary portion is a stress concentration portion and is a region that tends to be a starting point of fracture. Therefore, the acting stress can be relieved and the rigidity of the welded portion can be improved. As a result, it is possible to further improve the strength of, for example, the joint portion of the workpiece.

In the holding jig for double-acting friction stir spot welding having the above-described configuration, the inclined surface may be formed of at least one of a flat surface and a cuffed surface.

A holding jig set for double-acting friction stir spot welding according to the present disclosure may be a holding jig set used for the double-acting friction stir spot welding device and configured to hold the workpiece. The holding jig set may include a holding jig for a double-acting friction stir spot welding device having the above configuration and a backing member that is positioned on an advancing direction side of the rotary tools and supports a reverse surface of the workpiece on a supporting surface with an obverse surface of the workpiece facing the rotary tools. A circular concave portion having a peripheral edge portion that is an inclined surface inclined so as to reduce a diameter from the supporting surface toward a depth direction may be formed in the supporting surface of the backing membe.

According to the above configuration, while a concave region can be formed in the obverse surface side of a workpiece with the clamp member and the rotary tools, a concave region can also be formed in the reverse surface side of the workpiece by the concave portion in the supporting surface of the backing member. This makes it possible to form thick regions having increased thicknesses on the both surfaces of the workpiece by filling the concave regions of both surfaces of the workpiece with the material. Moreover, in each of these thick regions on both surfaces, the stirred portion boundaries, which are stress concentration portions, are located at the thick regions. Therefore, the acting stress can be relieved and the rigidity of the welded portion can be further improved.

In the holding jig set for double-acting friction stir spot welding having the above-described configuration, the inclined surface may be formed of at least one of a flat surface and a curved surface.

A double-acting friction stir spot welding device according to the present disclosure may include the holding jig for double-acting friction stir spot welding which has the above configuration or the holding jig set for double-acting friction stir spot welding which has the above configuration.

A double-acting friction stir spot welding method according to the present disclosure may be a double-acting friction stir spot welding method of welding a workpiece held by a holding jig by partially stirring the workpiece with rotary tools. A cylindrical pin member that is configured to rotate around an axis and be movable forward and backward along the axis and a cylindrical shoulder member that is positioned so as to surround an outside of the pin member and is configured to rotate around the axis of the pin member and be movable forward and backward along the axis may be used as the rotary tools in a forward/backward movable state. A clamp member that has a cylindrical shape positioned so as to surround an outside of the shoulder member and is configured to press the workpiece from an obverse surface with an annular pressing surface of a distal end of the clamp member may be used as the holding jig. The clamp member may have an inclined surface that is adjacent to an inner edge portion of the pressing surface and inclined so as to reduce an inner diameter of the clamp member toward a back side as viewed from the pressing surface. The method may include aligning a contact surface of the shoulder member with an upper edge of the inclined surface of the clamp member to form a concave region by at least the inclined surface and the contact surface, and filling the concave region with a material constituting the workpiece.

In the double-acting friction stir spot welding method having the above configuration, the concave region may be formed by advancing and retracting the shoulder member, and the pin member may be press-fitted into a stirred portion of the material Which is formed by partially stirring the workpiece with the rotary tools, thereby filling the concave region with the material of the stirred portion.

In the double-acting friction stir spot welding method having the above configuration, an additional material that is allowed to be stirred and mixed with the material constituting the workpiece may be supplied to a region of the workpiece which is to be stirred or a welded portion formed on the workpiece, the concave region may be formed after the workpiece is stirred together with the additional material with at least one of the pin member and the shoulder member, and the concave region may be filled with the material.

In the double-acting friction stir spot welding method having the above configuration, a backing member that is positioned on an advancing direction side of the rotary tools and supports a reverse surface of the workpiece on a supporting surface with the obverse surface of the workpiece facing the rotary tools may also be used as the holding jig, a circular concave portion having a peripheral edge portion that is an inclined surface inclined so as to reduce the diameter from the supporting surface toward a depth direction may be formed in the supporting surface of the backing member, and both the concave region and the concave portion may be filled with the material.

In the double-acting friction stir spot welding method having the above configuration, the additional material may be supplied so as to come into contact with at least one of the obverse surface and the reverse surface of the workpiece.

According to the double-acting friction stir spot welding method having the above-described configuration, a concave region is formed at least on the obverse surface of the workpiece (or both the obverse and reverse surfaces), and the material can be filled in the concave region by moving the rotary tools back and forth. Therefore, a thick region where the stirred portion boundary is located can be formed on at least the obverse surface (or both the obverse and reverse surfaces) of the welded portion of the workpiece.

Moreover, the material for forming the thick region may be supplemented with a material that has been pushed away by press-fitting the pin member, or may be supplemented by supplying an additional material. In the double-acting friction stir spot welding method having the above configuration, because the welded portion of the workpiece can be selectively thickened, using a material pushed away by the pin member makes it possible to form a thick welded portion without increasing the weight, whereas supplying an additional material makes it possible to suppress an increase in weight to a necessary minimum level when forming a thick welded portion. Further, by supplying an additional material, a concave portion derived from the rotary tools can be backfilled to form the welded portion into a substantially flat shape.

In the double-acting friction stir spot welding method, at least one of the inclined surface provided on the clamp member and the inclined surface provided on the supporting surface of the backing member is formed from at least one of a flat surface and a curved surface.

From the above description, many improvements and other embodiments of the present application are apparent to those skilled in the art. Accordingly, the above description is to be construed as illustrative only, and is provided for the purpose of teaching those skilled in the art the best mode of carrying out the present application. It is possible to substantially change the details of its structure and/or function without departing from the spirit of the present application.

It should be noted that the present application is not limited to the embodiments described above, and various modifications can be made within the scope of Claims. Embodiments obtained by suitably combining technical means that are disclosed in different embodiments and variations also fall within the technical scope of the present application.

From the foregoing explanation, many modifications and other embodiments of the present application are obvious to one skilled in the art. Therefore, the foregoing explanation should be interpreted only as an example and is provided for the purpose of teaching the best mode for carrying out the present invention to one skilled in the an. The structures and/or functional details may be substantially modified within the scope of the present application.

The present application can improve the strength of a welded portion in double-acting friction stir spot welding, and hence can be widely used in various fields using double-acting friction stir spot welding.

REFERENCE SIGNS LIST 10A, 10B friction stir spot welding device
11 pin member (rotary tool)
11a pin contact surface
12 shoulder member (rotary tool)
12a shoulder contact surface
13 clamp member (holding jig)
13a pressing surface
13b inclined surface
14 spring
15 tool driving unit
16 backing member (holding jig)
16a supporting surface
16b supporting surface concave portion
60 workpiece
60a obverse surface
60b reverse surface
60c stirred portion
60d concave portion
60e stirred portion boundary
61 front-side workpiece
62 back-side workpiece
63A to 63C welded portion
64, 65 additional material
71 conventional welded portion
72 comparative welded portion
S0 gap region (between shoulder member and clamp member)
S1 annular concave region
S2 circular concave region
S3 gap region (between shoulder member and supporting surface concave portion)

The invention claimed is:

1. A double-acting friction stir spot welding method of welding a workpiece held by a holding jig by partially stirring the workpiece with rotary tools, wherein the holding jig comprises:
a pin that is configured to rotate around an axis and be movable forward and backward along the axis and a shoulder that is positioned so as to surround an outside of the pin and is configured to rotate around the axis of the pin and be movable forward and backward along the axis are used as the rotary tools in a forward/backward movable state, and
a clamp that has a cylindrical shape positioned so as to surround an outside of the shoulder and is configured to press the workpiece from an obverse surface with an annular pressing surface of a distal end of the clamp is used as the holding jig,
the clamp having an inclined surface that is adjacent to an inner edge portion of the pressing surface and inclined so as to reduce an inner diameter of the clamp toward a back side as viewed from the pressing surface such that an outer diameter of the clamp is maintained and the inner diameter increases toward the distal end,
the method comprising:
aligning a contact surface of the shoulder with an upper edge of the inclined surface of the clamp to form a concave region by at least the inclined surface and the contact surface;
filling the concave region with a material constituting the workpiece.

2. The double-acting friction stir spot welding method according to claim 1, comprising:
forming the concave region by advancing and retracting the shoulder; and
press-fitting the pin into a stirred portion of the material which is formed by partially stirring the workpiece with the rotary tools to fill the concave region with the material of the stirred portion.

3. The double-acting friction stir spot welding method according to claim 1, comprising:
supplying an additional material that is allowed to be stirred and mixed with the material constituting the workpiece to a region of the workpiece which is to be stirred or a welded portion formed on the workpiece;
forming the concave region after the workpiece is stirred together with the additional material with at least one of the pin or the shoulder; and
filling the concave region with the material.

4. The double-acting friction stir spot welding method according to claim 3, comprising supplying the additional material so as to come into contact with at least one of the obverse surface or the reverse surface of the workpiece.

5. The double-acting friction stir spot welding method according to claim 3, comprising:
also using a second holding jig that is positioned on an advancing direction side of the rotary tools and supports a reverse surface of the workpiece on a supporting surface with the obverse surface of the workpiece facing the rotary tools as the holding jig;
forming a circular concave portion having a peripheral edge portion that is an inclined surface inclined so as to reduce a diameter from the supporting surface toward a depth direction in the supporting surface of the second holding jig; and filling both the concave region and the concave portion with the material.

6. The double-acting friction stir spot welding method according to claim 5, comprising supplying the additional material so as to come into contact with at least one of the obverse surface or the reverse surface of the workpiece.

7. The double-acting friction stir spot welding method according to claim 6, comprising forming at least one of the inclined surface provided on the clamp or the inclined surface provided on the supporting surface of the second holding jig from at least one of a flat surface or a curved surface.

8. The double-acting friction stir spot welding method according to claim 5, comprising forming at least one of the inclined surface provided on the clamp or the inclined surface provided on the supporting surface of the second holding jig from at least one of a flat surface or a curved surface.

* * * * *